United States Patent [19]

Tsai et al.

[11] Patent Number: 5,049,634
[45] Date of Patent: Sep. 17, 1991

[54] DERIVATIZED AND/OR CROSSLINKED PRODUCTS FROM ACETAL- AND ALDEHYDE-CONTAINING POLYSACCHARIDE GRAFT POLYMERS

[75] Inventors: John J. Tsai, Belle Mead; Patrick G. Jobe, Westfield; Robert L. Billmers, Stockton; Rama S. Chandran, South Bound Brook, all of N.J.

[73] Assignee: National Starch and Chemical Investment Holding Corporation, Wilmington, Del.

[21] Appl. No.: 411,432

[22] Filed: Sep. 22, 1989

[51] Int. Cl.$^5$ ............................................. C08G 89/03
[52] U.S. Cl. ..................................... 527/312; 527/313; 527/314; 527/315
[58] Field of Search ................. 527/312, 313, 314, 315

[56] References Cited

U.S. PATENT DOCUMENTS

| | | | |
|---|---|---|---|
| 4,663,448 | 5/1987 | Chung-Wai Chiu | 536/111 |
| 4,675,394 | 6/1987 | Solarek et al. | 536/43 |
| 4,731,162 | 3/1988 | Solarek et al. | 162/175 |
| 4,741,804 | 5/1988 | Solarek et al. | 162/175 |
| 4,749,800 | 6/1988 | Jobe et al. | 549/452 |
| 4,788,280 | 6/1989 | Billmers et al. | 526/238.2 |
| 4,801,699 | 1/1989 | Jobe et al. | 536/59 |
| 4,804,769 | 2/1989 | Solarek et al. | 549/374 |
| 4,839,449 | 9/1988 | Billmers et al. | 536/104 |
| 4,866,151 | 9/1989 | Tsai et al. | 527/300 |

*Primary Examiner*—Nathan M. Nutter
*Attorney, Agent, or Firm*—Margaret B. Kelley; Edwin M. Szala

[57] ABSTRACT

A derivatized graft polymer of a polysaccharide, a crosslinked graft polymer of a polysaccharide, and a derivatized and crosslinked graft polymer of a polysaccharide are prepared. The derivatized polymer has the structure Sacch-g-[(M—CH=N—Y)$_x$-g-[(M)$_q$]; the crosslinked polymer has the structure Sacch-g-[(M—CH=N)$_z$-P]$_w$-g-[(M)$_q$] or Sacch-g-[(M—CH=C)$_z$-P]$_w$-g-[(M)$_q$]; the derivatized and crosslinked polymer has the structure Sacch-g-[(M—CH=N—Y)$_x$]-g-[(M—CH=N)-P]-g-[(M)$_q$] or Sacch-g-[(M—CH=N—Y)$_x$]-g-[(M—CH=C)$_z$-P]$_w$-g-[(M)$_q$]. Sacch represents a polysaccharide such as starch, gum, or cellulose; g-represents a graft; M represents one or more ethylenically or allylically unsaturated monomers, at least one of which contains an acetal or aldehyde; P represents a multivalen residue from a reagent containing more than one primary amine group or ketone group; —N= represents the group formed when one primary amine group of P reacts with the acetal or aldehyde group of the monomer repecting unit M; 13 CH= represents the group formed when one of the ketone groups of P reacts with the acetal or aldehyde group of the monomer repeating unit M; x is at least 1; z is at least 2; w is at least 1; and q is 0 or greater.

20 Claims, No Drawings

DERIVATIZED AND/OR CROSSLINKED PRODUCTS FROM ACETAL- AND ALDEHYDE-CONTAINING POLYSACCHARIDE GRAFT POLYMERS

BACKGROUND OF THE INVENTION

This invention relates to novel derivatized, crosslinked, and derivatized and crosslinked polysaccharide graft polymers.

Oxidative and non-oxidative methods have been used to introduce aldehyde groups into polysaccharides such as starches, gums, and celluloses. The oxidative methods used have included treatment with periodic acid, periodates, alkali metal ferrates, and alkali metal bromites or hypobromites. See U.S. Pat. No. 3,086,969 (issued Apr. 23, 1963 to J. E. Slager), U.S. Pat. No. 3,062,652 (issued Nov. 6, 1962 to R. A. Jeffreys et al.), U.S. Pat. No. 3,632,802 (issued Jan. 4, 1972 to J. N. BeMiller et al.), and U.S. Pat. No. 3,553,193 (issued Jan. 5, 1973 to D. H. LeRoy et al.). The disadvantages of the oxidative method include degradation to lower molecular weight products and the formation of carboxyl groups due to further oxidation of the aldehyde groups. The presence of carboxylic groups in aldehyde starches has several disadvantages in addition to the obvious reduction in the degree of aldehyde substitution. These include the introduction of hydrophilic properties due to the carboxyl groups, an upset in the cationic/anionic ratio when a cationic starch base is used and the possible formation of salts which could give rise to ionic crosslinking.

The non-oxidative methods typically involve the reaction of the polysaccharide with an aldehyde-containing reagent. See U.S. Pat. No. 3,519,628 (issued July 7, 1970 to S. M. Parmerter), U.S. Pat. No. 3,740,391 (issued June 19, 1973 to L. L. Williams et al.) and U.S. Pat. No. 2,803,558 (issued Aug. 20, 1957 to G. D. Fronmuller). The starch derivative of Parmerter is prepared by reaction with an unsaturated aldehyde (e.g., acrolein) and has the structure Starch-O—CH($R^1$)—CH($R^2$)—CHO where $R^1$ and $R^2$ are hydrogen, lower alkyls or halogen. The starch derivative of Williams is prepared by reaction with acrylamide followed by reaction with glyoxal. The gum derivative of Fronmuller is prepared by treating the dry gum (e.g., locust bean or guar gum) with peracetic acid to reduce the viscosity, neutralizing, and then reacting with glyoxal. Water-soluble cellulose ethers (e.g., hydroxyethylcellulose) have been reacted with glyoxal or ureaformaldehyde to give aldehyde-containing derivatives.

One of the disadvantages of introducing the aldehyde groups directly using an aldehyde-containing reagent is the possibility of the derivative crosslinking prior to use.

The major uses for dialdehyde starches reflect the reactive nature of the polymeric polyaldehyde in crosslinking substrates containing amino, hydroxyl and imino groups. See Japan Kokai 57-202,263 (published Dec. 11, 1982, Hohnen Oil Co., Ltd., C.A. 98: 200152m 1983) which discloses a water-resistant aqueous adhesive containing dialdehyde starch and a compound containing two or more isocyanate groups (e.g., polymethylenepolyphenylene polyisocyanate). See U.S. Pat. No. 3,706,633 (issued Dec. 19, 1972 to E. Katchalski et al.) which discloses the crosslinking of dialdehyde starch with an alkylene diamine (e.g., hexamethylene diamine or methylene dianiline) to form a highly crosslinked product. However, the crosslinking cannot be controlled because the granular dialdehyde starch is reactive toward the starch hydroxyls, thus leading to premature self-crosslinking rather than crosslinking via the diisocyanate or diamine.

Aldehyde-containing synthetic heteropolysaccharides are disclosed in U.S. Pat. No. 4,663,448 (issued May 5, 1987 to Chung-Wai Chiu). They have the structure R'—O—A—O—Starch where A is —CH$_2$—CH$_2$— or —CH$_2$—CH(OH)—CH$_2$—, Starch-O represents a starch molecule, and R' is

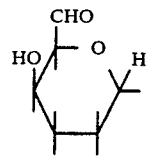

which represents a hexose containing a galactose configuration. A is attached to the hexose by an acetal linkage and to the starch by an ether linkage. Acetal- and aldehyde-containing polysaccharides are disclosed in U.S. Pat. No. 4,675,394 (issued June 23, 1987 to Daniel B. Solarek et al.), U.S. Pat. No. 4,731,162 (issued Mar. 15, 1988 to Daniel B. Solarek et al.), U.S. Pat. No. 4,741,804 (issued May 3, 1988 to Daniel B. Solarek et al.), U.S. Pat. No. 4,749,800 (issued June 7, 1988 to Patrick G. Jobe et al.), U.S. Pat. No. 4,788,280 (issued Nov. 29, 1988 to Robert L. Billmers et al.), U.S. Pat. No. 4,801,699 (issued Jan. 3, 1989 to Robert L. Billmers et al.), U.S. Pat. No. 4,804,769 (issued Feb. 14, 1989 to Martin M. Tessler et al.), and U.S. Pat. No. 4,839,449 (issued June 13, 1989 to Robert L. Billmers et al.).

Polysaccharide graft polymers containing acetal and aldehyde groups are disclosed in U.S. Pat. No. 4,860,151 issued June 13, 1989 in the name of John J. Tsai et al.

These acetal-containing products, both the derivatives and graft polymers, have been shown to possess some very unique properties. Once the polysaccharide is dispersed and the acetal is converted to aldehyde by lowering the pH to less than 7, crosslinking can occur between the aldehyde and any available hydroxyl group.

There is always a need for new derivatized Polysaccharides and crosslinked polysaccharides, particularly polysaccharide which will crosslink when desired.

SUMMARY OF THE INVENTION

The present invention provides a derivatized graft polymer of a polysaccharide having the general structure Sacch-g-[(M—CH=N—Y)$_x$]-g-[(M)$_q$] where Sacch represents a polysaccharide; g- represents a graft; M represents a repeating unit derived from one or more ethylenically or allylically unsaturated monomers, at least one of which contains an aldehyde or acetal group; Y is (a) a monovalent group derived from a water-soluble substituted or unsubstituted aromatic compound containing only one primary amine group, or (b) a monovalent group derived from a water-soluble substituted or unsubstituted aliphatic or cycloaliphatic compound containing only one primary amine group, or (c) a multivalent group derived from a water-soluble protein containing more than one primary amine group; —CH=N—Y group is formed by the reaction of the aldehyde or acetal group of the monomer repeating unit M with the primary amine group of Y; x is at least 1; and q is 0 or greater.

The derivatives are prepared by graft polymerizing one or more ethylenically or allylically unsaturated monomers, at least one of which contains an aliphatic or aromatic acetal group [—CH(OA)(OA')] or an an aliphatic or aromatic aldehyde group [CHO] onto a polysaccharide and then reacting the resulting acetal- and-/or aldehyde containing polysaccharide graft polymer with a derivatizing reagent (Y—NH$_2$) containing only one free primary amine group e.g., polyethyleneglycol monoamine, 3-aminopropyltrimethoxysilane, 3-aminopropyltriethoxysilane, cyclohexylamine, ethanol amine, benzyl amine, isopropyl amine, or an amino acid. In the acetal groups, A and A' are independently a lower alkyl or A and A' together form at least a 5-membered cyclic acetal. The acetal groups or aldehyde groups of the polysaccharide graft polymer react with the primary amine of the derivatizing reagent to form the imine group (—CH=N—Y).

The present invention also provides a crosslinked polysaccharide having the structure

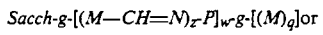

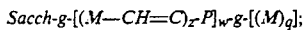

where Sacch, g-, M, and q are as defined above; P represents a multivalent residue from a reagent containing more than one primary amine or ketone group which reacts with the acetal or aldehyde group of the monomer repeating unit M; —CH= represents the group formed when one of the ketone groups of P reacts with the acetal or aldehyde group of the monomer repeating unit M; —N= represents the group formed when one of the primary amine groups of P reacts with the acetal or aldehyde group of the monomer repeating unit M; z is at least 2; and w is at least 1. The upper limit for w will depend upon the number of functional groups (i.e., primary amines or methyl ketones) on P.

They are prepared by graft polymerizing one or more ethylenically or allylically unsaturated monomers, at least one of which contains an aliphatic or aromatic acetal group or an aliphatic or aromatic aldehyde group, onto a polysaccharide, then dispersing the acetal- or aldehyde-containing Polysaccharide graft polymer in water, and reacting the graft polymer with an effective amount of a reagent which contains multifunctional crosslinking groups. Suitable reagents include an aliphatic polyamine containing at least two primary amine groups, a polyhydrazine, a polyhydrazide, a polysemicarbazide, a polythiol, and a polyketone.

The present invention further provides derivatized and crosslinked graft polymer of a polysaccharide having the structure

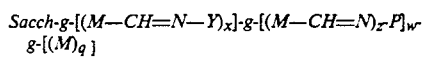

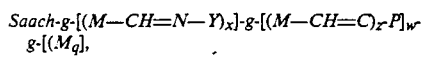

where Sacch, g-, M, P, x, z, w and q are as defined above.

They are prepared by reacting the above derivatized graft polymer of a polysaccharide with a crosslinking reagent such as those discussed above or by reacting the above crosslinked graft polymer of a polysaccharide with a derivatizing reagent such as those discussed above. The derivatized or crosslinked graft polymer of the polysaccharide must still have unreacted acetal or aldehyde groups on the monomer repeating units available for reaction with the crosslinking reagent or the derivatizing reagent.

The derivatized and/or crosslinked polysaccharides are useful in conventional applications where water-soluble or water-swellable polysaccharide derivatives are useful, for example, as coatings, adhesives and paper additives. The silane-containing derivatives should be particularly useful as in glass forming sizes. The crosslinked products should be particularly useful as water resistant adhesives.

DESCRIPTION OF THE PREFERRED EMBODIMENTS

The method for preparing graft copolymers of polysaccharides such as starches, cellulose, and gums are well known in the literature. See, for example, Block and Graft Copolymerization, Vol. 1, R. J. Ceresa, ed., John Wiley and Sons (1973). Such methods, as represented by the teachings of U.S. Pat. Nos. 3,809,644, 3,976,522, and 4,131,576, include polymerizations in water, in water-solvent mixtures, and in the dry state and may be initiated by mechanical, chemical, and irradiative techniques.

The preferred method of preparing the acetal-containing polysaccharide graft polymers involves free radical polymerization of the acetal-containing monomer with the polysaccharide. Modification of starch by graft polymerization is described at pages 22-47 to 22-54 in Chapter 22: Starch and Its Modifications in the Handbook of Water-Soluble Gums and Resins, edited by Robert L. Davidson, McGraw-Hill Book Co., New York 1980. Free radical initiating methods include physical (e.g., irradiation) and chemical methods (e.g., the use of catalysts). Suitable catalysts include those of the type that establish mild oxidizing conditions in the reaction mixture in the concentrations used and are usually classified as free radical formers or sometimes called peroxide catalysts. This class of catalysts include, among others, hydrogen peroxides, aqueous soluble organic peroxides, hydroperoxides, persulfate salts such as potassium and ammonium persulfate, ceric ions, and redox catalysts. Other free radical catalysts are those classified as water soluble "azo" catalysts such as 2,2'-azo-bis(amidinopropane) hydrochloride. The reaction is typically carried out until all of the monomer is consumed. Typically, the starch grafts are prepared by suspending the starch in an aqueous solution, heating the suspension until the starch is gelatinized, adding the monomer, and then adding the free radical catalyst. Granular starches can also be used. They may be first heated in water at 50° C. for one hour to swell before cooling to room temperature for the subsequent polymerization reaction.

The preferred method for preparing the aldehyde-containing polysaccharide graft polymers involves hydrolyzing the acetal groups of an acetal-containing polysaccharide graft polymer at a pH of less than 7, preferably 5 or less, most preferably 2-4. In most cases, direct grafting of the aldehyde-containing monomer to the polysaccharide substrate is not recommended.

The polysaccharide graft polymers may be prepared using one or more acetal-containing monomers. However, in some applications where the presence of fewer aldehyde groups (formed by hydrolyzing the acetal) is desirable, other typical comonomers can be used. These can include ethylenically unsaturated monomers which may contain anionic or cationic charges. Suitable monomers include styrene and substituted styrenes such as vinyl toluene, α-methyl styrene and chlorostyrene; compounds having the acrylic group as the polymerizable nucleus, such as acrylic and methacrylic acids, and salts or esters thereof (including the methyl, ethyl, and butyl esters); acrylonitrile; vinyl chloride; vinyl acetate and other vinyl esters; vinyl pyridine and vinyl pyrrolidone; vinyl ketones; vinylidene compounds, such as vinylidene chloride; allylidene compounds such as allylidene diacetates; conjugated diene monomers such as butadiene-1,3, isoprene, chlorobutadiene-1,3; diallylamine and its respective salts, N-alkyl diallylamine and its respective salts, diallyl dialkyl ammonium quarternary salts, N,N-dialkylaminoalkyl acrylate and methacrylate and the respective salts, N,N-dialkylaminoalkyl acrylamide and methacrylamide and the respective salts and vinylbenzyldialkyl amine and their respective salts, and such acids as vinylsulfonic acid, styrene sulfonic acid, (meth-)acrylamidopropanesulfonic acid and the respective salts.

Several polymerization procedures may be used. In one method a water-soluble monomer is graft polymerized with a granular starch, gelatinized starch or any gum, cellulose, or cellulose derivative. The procedure described in Block and Graft Copolymerization by R. J. Ceresa (cited previously) is suitable. In a second and preferred method, the grafting is carried out in a two-phase system as described in U.S. Pat. No. 4,131,576 issued Dec. 26, 1978 to C. P. Iovine et al.

After completion of the graft reaction the solid acetals may be separated, if desired, from the reaction mixture by centrifugation or filtration. Preferably, the graft polymer is purified by washing with water in the case of the starch graft polymers, with the aqueous solution of water-miscible solvent in the case of the gum graft polymers, or with the solvent in the case of the cellulose graft polymers. Further washing with the same solvent may be desirable for the gum graft polymers. The graft polymers may then be dried using conventional methods, as in a vacuum, drum, flash, belt, or spray drier.

The conversion of the polysaccharide acetals to the aldehydes is carried out under acidic conditions, typically at a pH of 7 or less, preferably 5 or less, most preferably at about 2–3. It may be carried out directly without isolation of the acetal or the acetal may be isolated as above and resuspended in water prior to conversion. If desired, the aldehyde graft polymers may be recovered as described above.

When the polysaccharide is starch, applicable starch bases which may be used herein may be derived from any plant source including corn, potato, sweet potato, wheat, rice, sago, tapioca, waxy maize, sorghum, high amylose corn, or the like. Starch flours may also be used as the starch source. Also included are the conversion products derived from any of the former bases including, for example, dextrins prepared by the hydrolytic action of acid and/or heat; oxidized starches prepared by treatment with oxidants such as sodium hypochlorite; and fluidity or thin-boiling starches prepared by enzyme conversion or mild acid hydrolysis. The starch base may be a granular starch or a gelatinized starch, i.e., non-granular starch.

The polysaccharide molecule may also be modified by the introduction of other substituent groups such as cationic groups, anionic groups, nonionic groups, amphoteric groups, and/or zwitterionic groups, provided none of the groups contain primary amine groups.

Typical substituent groups include hydroxyalkyl groups (e.g., hydroxypropyl ether groups), carboxyalkyl ether groups (e.g., carboxymethyl ether group), ester groups (e.g. acetate groups), tertiary amine groups (e.g., diethylaminoethyl ether groups), and quaternary amine groups (e.g., 3-(trimethylammonium chloride)-2-hydroxypropyl groups or 4-(trimethylammonium chloride)2-butenyl groups). These groups are introduced prior to or after the graft polymerization. One of the advantages of grafting is that the reaction can be carried out at a neutral PH. Therefore, the more labile substituents present on the polysaccharide are not affected.

The polysaccharide molecule may also be modified by the introduction of ether or ester substituents containing acetal groups which can be subsequently converted to an aldehyde as disclosed in U.S. Pat. Nos. 4,675,394; 4,731,162; 4,741,804; 4,749,800; 4,788,280; 4,801,699; 4,804,769; and 4,839,449.

When the polysaccharide is gum, applicable bases which may be used herein are polygalactomannans, such as guar gum or locust bean gum, which are heteropolysaccharides composed principally of long chains of 1→4 -β-D-mannopyranosyl units to which single unit side chains of α-D-galactopyranosyl units are joined by 1→6 linkages and hereafter referred to as "gums." Also suitable is gum arabic. Also included are degraded gum products resulting from the hydrolytic action of acid, heat, shear, and/or enzyme; oxidized gums; and derivatized gums.

When the polysaccharide is cellulose, applicable bases useful herein include cellulose and cellulose derivatives, especially water-soluble cellulose ethers such as alkyl and hydroxyalkylcelluloses, specifically methylcellulose, hydroxyethylmethylcellulose, and ethylhydroxyethylcellulose.

Acetal- and aldehyde-containing monomers suitable for graft polymerization to a polysaccharide include known acetal-containing acrylamide and methacrylamide monomers such as N-(2,2-dimethoxyethyl)-N-methylacrylamide, N-(2,2-dimethoxyethyl)-N-methylmethacrylamide, and 3.3-dimethoxy-2,2-dimethylpropyl methacrylate. These known acrylamide and methacrylamide monomers are prepared according to the procedure reported by R. Epton and J. V. McLaren in Polymer, Vol. 15, p. 565(1974). Acryloyl or methacryloyl chloride is added to a molar equivalent of N-(2,2-dimethoxyethyl), N-methyl amine in a dichloromethane-aqueous caustic (20%) mixture at low temperature (−5 to 5° C.). The dichloromethane solution is separated from the aqueous layer, filtered, and stripped to isolate the product. The known methacrylate monomers may be prepared by reacting an alcohol-containing acetal compound with methacryloyl chloride in dichloromethane with triethylamine.

Other suitable acetal and aldehyde-containing monomers are described in U.S. Pat. No. 4,866,151 issued June 13, 1989, the disclosure of which is incorporated herein by reference. They include 2[2-(1,3-dioxolan-2-yl)ethoxy]ethyl methacrylate, 2-[2-(1,3-dioxolan-2-yl)-1-methylethoxy]ethyl methacrylate, N-methyl, N-(2,2-dimethoxy)ethyl, N,N-diallylammonium bromide, 2-(5,5-dimethyl-1,3-dioxan-2-yl)-ethoxyethyl acrylate, 2-(5,5-dimethyl-1,3-dioxane-2-yl)ethyl acrylate, N-[2-5,5-dimethyl-1,3-dioxan-2-yl)ethyl acrylamide, [1-(5,5-dimethyl-1,3-dioxan-2-yl]-2-propyl acrylate, 3-(N-methyl, N-2,2-dimethoxyethyl)amino-2-hydroxypropyl methacrylate, N,N-dimethyl, N-[3-(2-dioxolan-2-yl) ethoxyethoxy-2-hydroxpropyl methacrylamidopropylammonium chloride, (5-(dimethoxymethyl)-furfur-2-yl]methyl acrylate, 5-(N,N-di-[propyl-1-en-3-]aminomethyl)-2-furan carboxyaldehyde, 5-(N,N-di-[propyl-1-en-3-]aminomethyl)-2-dimethoxymethyl furan, 5-(propyl-1-en-3-oxymethyl)-2-furan carboxyaldehyde, 5-(N-propyl-1-en-3-aminomethyl)-2-furan carboxyaldehyde, 5-(propyl-1-en-3-oxymethyl)-2-dimethoxymethylfuran, and 5-(N-propyl-1-en-3-aminomethyl)-2-dimethoxymethyl furan.

The above monomers may be prepared in three or more ways. The first type of reactions are those between an alcohol- or amino-containing acetal and an acryl or methacryl compound having a reactive site such as an acryl halide (e.g., acryloyl chloride), an epoxide (e.g., glycidyl methacrylate), or an isocyanate (e.g., isocyanatoethyl methacrylate). The second type of reactions are those between an alcohol- or amino-containing vinyl monomer and an acetal having a reactive site such as a chlorohydrin or an epoxide group (e.g., 2-(glycidyloxyethoxy)-ethyl 1,3-dioxolane). The third type of reactions are those between two moles of an allyl halide and an amino-containing acetal or between diallylamine and an acetal with a reactive site such as those above. Styrene derivatives having a benzylic halide can also be used in preparing acetal-containing monomers.

The aromatic acetals and even the free aldehydes, being unreactive with the hydroxy groups on the polysaccharide, serve as sites for further modification. When this further modification is a derivatization, it is accomplished by reaction with a reagent which must contain only one free primary amine group. The reaction is carried out by slurrying the aromatic aldehyde-containing polysaccharide in water and/or a solvent depending upon the reagent selected. The amine-containing reagent is added and excess reagent is removed by filtration and the derivative is washed with water and/or a solvent. Typically, the reaction is done at room temperature. When the reagent is a water-soluble aromatic amine, it is preferable to carry out the reaction above room temperature in a solvent, e.g., ethanol.

If a reagent other than a protein is used which contains more than one free primary amine, a crosslinked product will result. Suitable reagents include water-soluble aliphatic primary amines such as ethanol amine. Also suitable are water-soluble aromatic amines; however, the reaction with these amines must be carried out at an elevated temperature in a solvent, e.g., ethanol. Also suitable are water-soluble synthetic polymers containing only one free primary amine (e.g., polyethylene glycol end-capped with an amine at one end) and water-soluble amino acids containing only one free primary amine (e.g., alanine). Water-soluble proteins which contain more than one primary amine (e.g., caseinate) are also suitable for use herein. The amines may contain substituents such as hydroxyl, silane, carboxyl, ester, amide, ketone, acetal, thiol, sulfide, sulfoxide, sulfone, sulfonic acid, phosphonic acids, and the like. The temperature required will depend upon the reagent. The reaction is carried out without the addition of an acid or a base. Because of the very mild condition required for this modification, derivatives can be prepared that could not have been made using standard techniques.

When the polysaccharide is a starch, the graft polymerization to introduce the aromatic aldehyde groups can be carried out while the starch is still in the granular form. These aldehydes can be further derivatized by reaction of the aldehyde group with an amine-containing reagent. This reaction can be carried out on the granular aromatic aldehyde-containing starch. If aliphatic aldehyde grafts are used, a crosslinked derivatized product will be obtained.

The crosslinked products are prepared by dispersing the aldehyde-containing polysaccharide graft polymer in water and reacting the dispersed polysaccharide with an effective amount of a multifunctional crosslinker. The amount used is typically about 0.5 to 100% by weight, preferably 50%, based on polysaccharide, but may be as low as 0.5-10% depending on the end use. When the crosslinker is an aliphatic polyamine (containing at least two primary amine groups), a polyhydrazine, a polyhydrazide, a polysemicarbazide, or a polythiol, the pH at which the aldehyde-containing derivative is crosslinked is typically about 2.5 to below 13. When the crosslinker is a cyclic or noncyclic polyketone, the pH must be above 11. The crosslinked products may also be prepared using the acetal-containing polysaccharide and the polyamine crosslinker; however, the pH must then be about 2 to 9.

The controlled reactivity of the polysaccharide graft polymers containing the aromatic aldehydes offers some very important advantages. Since the viscosity does not increase, no restriction is placed on the percent solids used and crosslinking can be carried out when desired, e.g., to impart water resistance and strength by the addition of multifunctional materials capable of crosslinking with the aromatic aldehydes or aromatic acetals. Suitable crosslinkers include aliphatic polyamines containing primary amine groups, cyclic and noncyclic polyketones, polyhydrazines, polyhydrazides, polysemicarbazides, polythiols and the like. Aromatic polyamines do not crosslink with the aldehydes, nor do aliphatic secondary amines. The polyketones only crosslink at a high pH (11).

Crosslinking of the aldehyde groups may be affected using polyamines ranging in molecular weight from the low molecular weight diethylene triamine (about 100) to the high molecular weight polyethyleneimines (about 100,000). The acetal-modified polysaccharides, e.g., starch, is cooked at pH 2.5 for about twenty minutes to convert the acetal to the aldehyde and disperse the polysaccharide. Crosslinking occurs as the polyamine (typically 0.1-1 g. of polyamine per 100 g. of the aldehyde-containing polysaccharide) is being added to the polysaccharide cook, but it occurs more rapidly at higher temperatures. The pH range at which the polysaccharide aldehyde crosslinking occurs is between 2.5 to 13.

Under certain conditions (i.e., pH 2.5 through 9.0) the polysaccharide acetal will crosslink upon the addition of the polyamine. The polysaccharide acetal is cooked at pH 7 and cooled prior to the polyamine addition. Above pH 9.0, no crosslinking of the dispersed polysaccharide acetal occurs even after 24 hours.

Crosslinking may also be effected using polyketones, e.g., 2,5-hexanedione. The polysaccharide acetal is cooked at pH 2.5 to disperse the starch and convert the acetal groups to the aldehydes. The pH is then adjusted to 12-13 and a small amount of the diketone (about 0.5 g.) is added. Crosslinking occurs rapidly if the diketone is added to the hot polysaccharide. It occurs more slowly if the polysaccharide is allowed to cool before the addition of the diketone.

Three methods are available for controlling the crosslinking process. The first involves adding the polyamine to a stable dispersion of the cooked aldehyde-containing polysaccharide at the time of use. For example, the dispersion is added to the pulp in the wet end and the polyamine is added (such as at the head box). It is thus possible to afford permanent wet strength, wet web strength, and dry strength.

The second method involves protecting the polyamine, e.g., by encapsulating it in a starch matrix. The encapsulated polyamine is added to the dispersed polysaccharide (i.e., cooked at pH 2.5). The dispersion shows very little change in viscosity until the mixture is placed in a boiling water bath. Upon heat the encapsulating material swells releasing the polyamine. A very firm gel (indicating crosslinking) forms in several minutes. If the mixture is not heated, but allowed to stand overnight, a slight release of the polyamine causes some crosslinking.

The third method involves protecting the aldehydes by converting the acetal to the aldehyde while still in the granular form (i.e., without dispersing the polysaccharide by cooking it). Polysaccharides containing aliphatic aldehydes are so inhibited (i.e., crosslinked) that they can not be dispersed by cooking. The polysaccharides containing the aromatic aldehydes can be readily dispersed by cooking. The presence of the aldehyde can be demonstrated by cooking the aldehyde-containing polysaccharide and then adding the polyamine. A gel forms almost instantly. A cook of the polysaccharide containing the acetal groups shows no change upon addition of polyamine.

If the high molecular polyethyleneimine is mixed with an aromatic aldehyde-containing starch in the granular form and the mixture is cooked in a boiling water bath, the starch will begin to disperse and then gel (i.e., crosslink). If a lower molecular weight polyamine is used, penetration and crosslinking occurs before the starch can be completely dispersed. The minimum molecular weight necessary to prevent penetration into the granule will depend on variables such as the starch base used, pH, derivatization, temperature, salt content, and the like.

The starch may be cooked prior to derivatization or crosslinking of the aldehyde-containing graft polymer or copolymer prior to the graft polymerization to form the acetal, subsequent to graft polymerization, after conversion of the acetal to the aldehyde, or during conversion of the acetal to the aldehyde. Cooking at pH 6 or less simultaneously converts the acetal to aldehyde and solublizes and disperses the starch aldehyde. Any conventional cooking procedure may be used, such as cooking a slurry containing the water-soluble or water-swellable derivative in a boiling water bath for about 20 minutes, blowing in steam to heat the slurry to about 93° C. (200° F.), or jet cooking. If a water-dispersible or water-soluble starch base is used for the preparation of the acetal, it will not be necessary to cook the acetal during the acid hydrolysis.

It can be appreciated by the practitioner that a large number of variations may be effected in selecting the derivatizing and crosslinking reagents, and reacting them with the aldehyde-containing graft polymers and copolymers in accordance with the procedures described above without materially departing from the scope and spirit of the invention. Such variations will be evident to those skilled in the art and are to be included within the scope of the invention.

In the examples which follow, all parts and percentages are given by weight and all temperatures are in degrees Celsius unless otherwise noted. Reagent percentages are based on dry polysaccharide. The nitrogen content was determined by the Kjeldahl method. The presence of aldehyde groups in the graft polymers and copolymers is determined qualitatively by the viscosity increase of a cooked (i.e., dispersed) slurry and/or gel formation upon hydrolyzing the acetal to generate the aldehyde and quantitatively by titration. The quantitative test is carried out by slurrying 5.0 g. of the polysaccharide acetal in sufficient distilled water to give 500 g. The pH is adjusted to 2.5 with hydrochloric acid. The polysaccharide is dispersed by cooking in a boiling water bath for 20 min. The dispersed polysaccharide is cooled and the solids determined. A 100 g. portion of the polysaccharide dispersion is weighed out, titrated with 0.1 NaOH to the first end point (inflection point is between pH 4 and 5) and the ml. of NaOH required is recorded ($T_1$) An aqueous solution (50 ml.) of hydroxylamine hydrochloride (prepared by dissolving 34.75 g. of the hydroxylamine hydrochloride in 1000 ml. volumetric flask and diluting to the mark with water) is added to a 100 g. portion of the polysaccharide dispersion, heated at reflux for 60 min., and titrated with 0.1 N NaOH to pH 4.5. The ml. of NaOH required to reach the inflection point (pH 3.0–3.5) is recorded ($T_2$).

$$\% \text{ aldehyde} = \frac{(T_2 - T_1) \times (\text{normality of NaOH}) \times (2.9)}{\text{polysaccharide weight}^*}$$

*polysaccharide weight = 100 g. × % solids of dispersed polysaccharide
Best results are obtained using an automatic titrator.
A blank of base polysaccharide (i.e., unmodified by the introduction of acetal groups) may also be run.

EXAMPLE I

This example describes the preparation of the novel aliphatic and aromatic acetal-containing monomers and aldehyde-containing monomers disclosed in U.S. Pat. No. 4,866,151 issued June 13, 1989, which are suitable for use in the graft polymerization onto the polysaccharide.

2[2-(1,3-Dioxolan-2-yl)ethoxy]ethyl methacrylate (I-A)

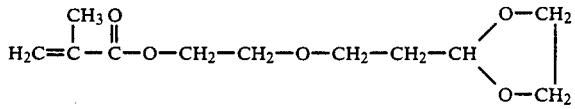

To a 500 ml four-neck round bottom flask equipped with a mechanical stirrer, condenser, thermometer and addition funnel were added 22.0 g triethylamine, 32.4g.2-[2-(2-hydroxyethoxy)ethyl-1,3-dioxolane, and 180 ml methylene chloride. The temperature was reduced to about 0° C. to −5° C. A total of 23.22 g. methacryloyl chloride was added dropwise through an addition funnel. While maintaining the temperature at about 0 to −5°, the mixture was then allowed to warm to room temperature and stirred for 30 min. and added to an equal volume (180 ml) of ice-water. The methylene chloride layer was separated from the aqueous layer, a small amount of anhydrous magnesium sulfate (3 g) was added, the solution was filtered, and methylene chloride was stripped off to isolate the product. Purification was done by distillation at 106° C. under 0.2 Hg pressure.

2-2-(1,3-Dioxolan-2-yl)-1-methylethoxy]ethyl methacrylate (I-B)

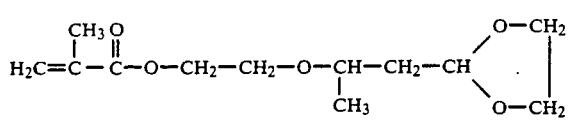

Following the above procedure, the monomer was prepared using 22 g triethylamine, 35.2 g 2-[2-(2-hydroxyethoxy)-propyl]-1,3-dioxolane, 23.22 g methacryloyl chloride, and 180 ml methylene chloride. The product was purified by vacuum distillation at 93.2° C. under 0.2 mm Hg pressure.

N-Methyl-N-(2,2-dimethoxy)ethyl-N,N-diallylammonium bromide (I-C)

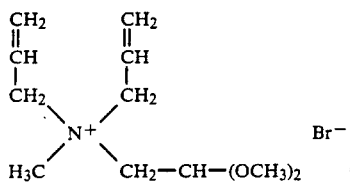

To a 250 ml four-neck round bottom flask, equipped as described in Example I, were added 23.83 g N-methylacetaldehyde dimethyl acetal and 25 ml tetrahydrofuran. Then 24.18 g allyl bromide were added slowly while maintaining the temperature about 0° C. After the addition was completed, the temperature was brought to 40° C. and the reaction mixture was stirred for 6 hours. It was then cooled to 0° C. and 50% aqueous sodium hydroxide solution (16 g) was added. Then, another equivalent amount of allyl bromide (24.18 g) was added slowly. The temperature was raised to 50° C. and the reaction mixture was stirred overnight. The reaction mixture was concentrated on a rotary evaporator. Acetone (400 ml) was added to the viscous liquid to precipitate the inorganic salt which was removed by filtration. The acetone solution was concentrated on the rotary evaporator to give the final product. The moisture of this ammonium salt could not be determined accurately. The ionic bromide was 26.78% (expected 28.52%) and the organic bromide was 0%.

2-(5,5-Dimethyl-1,3-dioxan-2-yl)ethoxyethyl acrylate (I-D)

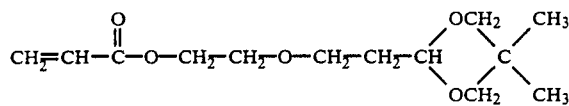

A mixture of hydroxyethyl acrylate (11.6 g), an equivalent amount of 2-ethylenyl-5,5-dimethyl-1,3-dioxane (EDD) (14.2 g), and a catalytic amount of p-toluenesulfonic acid (100 mg) was heated at 65° C. overnight. Gas chromatography showed that reaction occurred. The unreacted starting materials were removed at 40° C. under 0.05 mm Hg.

2-(5,5-Dimethyl-1,3-dioxan-2-yl)ethyl acrylate (I-E)

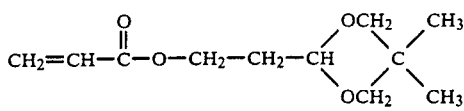

In the presence of a catalytic amount of p-toluenesulfonic acid (100 mg.) a mixture of acrylic acid (7.20 g., 0.1 mole) and 2-ethylenyl-5,5-dimethyl-1,3-dioxane (14.2 g.) was stirred at 60° C. for 16 hours. Gas chromatography separation (the column temperature was raised from 50° C. to 200° C. at a rate of 15° C./minute) showed a major product at 8.40 minutes and some unreacted unsaturated acetal at 1.50 minutes. Both unreacted starting materials were easily stripped off under vacuum.

N-[2-(5,5-Dimethyl-1,3-dioxan-2-yl)ethyl] acrylamide (I-F)

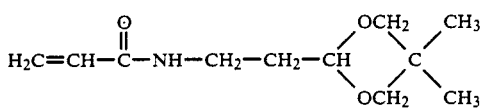

The product was prepared by reacting the unsaturated acetal (EDD) with acrylamide using a procedure similar to that described above.

[1-(5,5-Dimethyl-1,3-dioxan-2-yl]-2-propyl acrylate (I-G)

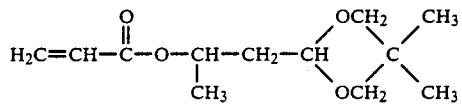

2-Propenyl-5,5-dimethyl-1,3-dioxane (PDD) was reacted with acrylic acid under the same conditions as the reaction with EDD (see Monomer IF).

3-(N-Methyl, N-2,2-dimethoxyethyl)amino-2-hydroxypropyl methacrylate (I-H)

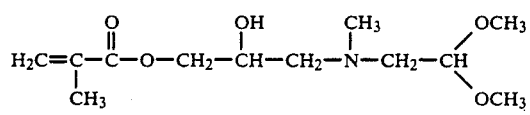

Glycidyl methacrylate (14.2 g.) was reacted with 11.9 g. of methylaminoacetaldehyde dimethyl acetal at 75° C. for 3 hours in the presence of a catalytic amount of tetrabutyl-ammonium chloride (150 mg.) and an inhibitor (50 mg. of 4-t-butyl catechol). Air was passed through the reaction mixture to prevent polymerization reactions. The product was isolated by vacuum distillation at 118° C. under 0.05 mm Hg pressure.

N,N-Dimethyl,N-[3-(2-dioxolan-2-yl)ethoxyethoxy-2-hydroxypropyl]methacrylamidopropylammonium chloride (I-I)

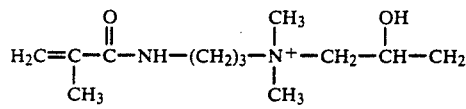

Dimethylaminopropyl methacrylamide (DMAPMA) was reacted with 2-(glycidyloxyethoxy)ethyl 1,3-dioxolane under acidic conditions to give the monomer. Thin-layer chromatography separation showed Rf 0.58, 0.35, and 0.18 for DMAPMA, 2-(glycidyloxyethoxy)ethyl 1,3-dioxolane, and the monomer, respectively (eluant: 50/50 toluene-methanol). The monomer can be purified by column chromatography.

This example describes the preparation of aromatic acetal-containing monomers suitable for graft polymerization.

[5-(Dimethoxymethyl)furfur-2-yl]methyl acrylate (I-J)

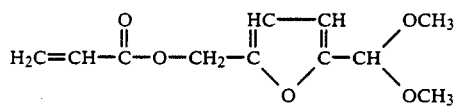

To a 500 ml. four-neck round bottom flask equipped with a mechanical stirrer, condenser, thermometer, and addition funnel were added triethylamine (10.3 g.), 2-hydroxymethyl furfural dimethyl acetal (17.2 g.), and methylene chloride (90 ml.). The temperature was brought down to 0–5° C., and acryloyl chloride (9.23 g.) was added dropwise through an addition funnel while the temperature was maintained at between 0° C. and −5° C. After the addition was completed, the bath was warmed to room temperature and stirred for 30 min. The reaction mixture was added to an equal volume (90 ml.) of ice-water. The methylene chloride layer was separated from the aqueous layer in a separatory funnel. A small amount of anhydrous magnesium sulfate was added to the methylene chloride solution. The methylene chloride was filtered and stripped to isolate the product which was purified by vacuum distillation at 95° C. under 0.5 mm Hg pressure.

5-(N,N-di-[propyl-1-en-yl]-amminomethyl)-2-furan carboxyaldehyde (I-K)

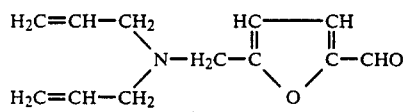

Using the procedure described above for the preparation of I-J, chloromethyl furfuraldehyde and diallylamine were reacted to provide the above monomer.

5-(N,N-di-[propyl-1-en-yl]aminomethyl)-2-dimethoxymethyl furan (I-L)

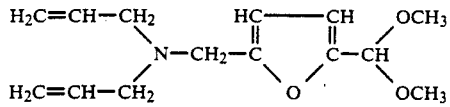

The above acetal-containing monomer was prepared by treating the monomer designated I-K with methanol in the presence of a trace amount of p-toluene sulfonic acid.

EXAMPLE II

This example discloses other aromatic acetal-containing and aldehyde-containing monomers which can be prepared using the above procedures and indicated reagents and which can be useful in the polysaccharide graft polymerization.

5-(Propyl-1-en-3-oxymethyl)-2-furancarboxyaldehyde (II-A)

from hydroxymethyl furfuraldehyde and allyl chloride

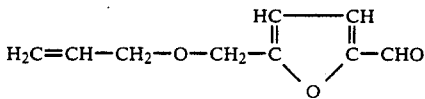

5-(N-Propyl-1-en-3-aminomethyl)-2-furancarboxyaldehyde (II-B) from chloromethyl furfuraldehyde and allyl amine

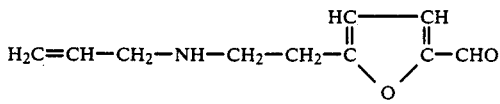

5-(Propyl-1-en-3-oxymethyl)-2-dimethoxymethyl furan (II-C)

by reaction of II-A with methanol

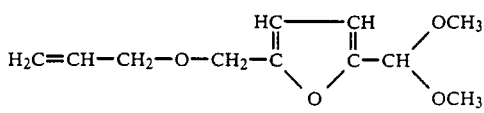

5-CN-Propyl-1-en-2-aminomethyl)-2-dimethoxymethyl furan

By reaction of II-B with methanol to convert the aldehyde to the acetal.

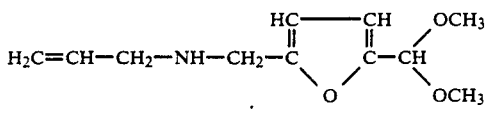

EXAMPLE III

This example describes the preparation of other novel acetal-containing monomers claimed in a copending application.

Part A

Phenyl (4-dimethoxymethyl) acrylate (4-PDMA) (III-A)

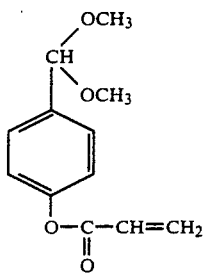

The preparation was carried out in two steps. In the first step dimethoxymethyl phenol was prepared and in the second step the 4-PDMA was prepared from the phenolic acetal.

To a 1 l. 4-neck flask equipped with a mechanical stirrer, condenser, calcium chloride drying tube and a thermometer were added 122 g. (1 mole) 4-hydroxybenzaldehyde, 150 g. absolute methanol, 124 g. (1.2 mole) trimethyl orthoformate and 2.5 g. (0.17 mole) polyvinylpyrdinium hydrochloride catalyst (prepared from polyvinyl pyridine and sold under the trade name Reillex 425). The mixture was heated under reflux (65° C.) for 1 hour. The solution was cooled and 2 g. (0.019 mole) anhydrous sodium carbonate was added. The mixture was stirred for 15 minutes. The insoluble inorganic salts and the catalyst were filtered off under suction. The product was isolated by removing the solvent and other volatile by-products under reduced pressure using a Rotovap. The residue was kept under a high vacuum (0.5 torr) for 1 hr. to remove any residual volatile components. The product was obtained as a light yellow oil. The yield was 98% (165 g.).

The product was characterized by IR and H-1 NMR. The IR showed no aldehyde carbonyl band at 1685 $CM^{-1}$. The H-1 NMR showed signals for methoxy methyl at 3.3 ppm but no aldehyde proton at 10.4 ppm. The purity of the sample was determined to be 96% from its GC on a carbowax-20M column.

In a 3 l. 4-neck flask equipped with a mechanical stirrer, condenser, 250 ml. pressure equalized addition funnel and thermometer were placed 107.5 g. (1.1 mole) triethylamine, 168 g. (1 mole) dimethoxymethyl phenol and 875 ml. anhydrous ether. The solution was cooled to 5° C. in an ice/salt mixture. A solution of 95 g. (1.05 mole) acryloyl chloride in anhydrous ether (125 ml.) was placed in the addition funnel. The acryloyl chloride solution was added at a rate sufficient to maintain the temperature below 10° C. The reaction mixture was stirred for an additional 30 min. after the acryloyl chloride addition was completed. The ice bath was removed and the reaction mixture was allowed to warm to room temperature. It was stirred for an additional 2 hr. after which the triethylamine hydrochloride was filtered off under suction. The filtrate was washed three times with 150 ml. of 0.1 N sodium hydroxide, washed with water until neutral (pH 6-7), and then washed twice with 50 ml. of saturated sodium chloride. The ether layer was dried over anhydrous magnesium sulfate and filtered. The solvent was removed under reduced pressure. The crude product was distilled under high vacuum (110° C., 0.1 mm. Hg) to yield 195 g. (88% yield) of the monomer.

The monomer was characterized by H-1 NMR and GC. H-1 NMR taken in $CDCl_3$ showed peaks at 5.8 and 6.5 ppm for the acrylate protons (3H) in addition to the signals for DMMP.

Phenyl (2-dimethoxymethyl acrylate (2-PDMA) (III-B)

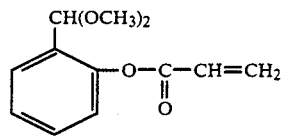

The two step preparation was carried out as above using 2-hydroxybenzaldehyde instead of 4-hydroxybenzaldehyde.

2-(2-Dimethoxymethylphenoxy)ethyl acrylate (2-DMPEA) (III-C)

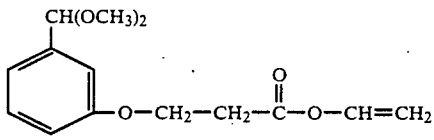

The synthesis was carried out in 3 steps.

In the first step 2-(2-hydroxyethoxy) benzaldehyde (2-HEBA) was prepared according to the literature procedure described by J. Almog, et al., Tetrahedron 1981, 37, p. 3589.

In the second step 166 g. (1 mole) of the 2-HEBA from the first step, 216 g. (3 moles) acrylic acid, 800 ml. cyclohexane, 9.6 g. (0.1 mole) methane sulfonic acid and 4 g. (0.008 mole) 4-methoxyphenol were placed in a 1-liter round-bottom flask equipped with a Dean-Stark tube, mechanical stirrer, thermometer, condenser, and a vented air inlet. The reaction mixture was heated to reflux under a slow stream of air and the water azeotrope was separated at the Dean-Stark trap. The reaction was complete in 4 hours at which time 19 ml. of aqueous distillate had been collected. By titration, this distillate was found to contain 10% acrylic acid. The reaction mixture was cooled and the cyclohexane was distilled off under reduced pressure (45° C., 160 mm.), followed by the acrylic acid (50-55° C., 15 mm.). The residue after distillation was dissolved in 600 ml. ether and washed with 1 N sodium hydroxide until the aqueous washings were distinctly basic (pH 9 to 10) and then washed with water until the washings were neutral. The organic layer was washed with 50 ml. of saturated sodium chloride and dried over anhydrous sodium sulfate (50 g.). The ether solution was filtered and the solvent removed under reduced pressure. The brown oily residue (178 g.) crystallized on standing. The yield was 81%.

The 2-(2-formylphenoxy)ethyl acrylate (2-FPEA) was purified by crystallization from hot cyclohexane (75 ml. per g. of ester). The white needles had a melting point 48° C. H-1 NMR taken in CDCl₃ showed signals at ppms 4.4 (m, 4H), 5.9 (m, 1H), 6.3 (m, 2H), 6.9–7.6 (m, 4H) and 10.4 (S₁ 1H).

In the third step the dimethyl acetal of the acrylic acid ester from the second step was prepared using the procedure described in the preparation of monomer III-A (4-PDMA). Typically, a reaction of 220 g. (1 mole) of the above acrylate gave 258 g. of a light yellow oil. The product can be further purified by short path (Kugel Rohr) vacuum distillation (110° C., 0.1 mm Hg). H-1 NMR in CDCl₃ showed signals at ppms 3.4 (2, 1H), 4.4 (m, 4H), 5.7 (S, 1H), 5.9 (m, 1H, 6.3 (m, 2H), 6.9–7.6 (m, 4H) and no signal at 10.4.

Monomers III-A (4-PDMA) and III-B (2-PDMA) can also be prepared by first making the 4- or 2-formyl phenoxy acrylate by reacting the respective hydroxybenzaldehydes with acryloyl chloride in the presence of an acid scavenger (similar to step 2 of PDMA synthesis). The dimethyl acetal of the 4- or (2-formylphenoxy) acrylate was prepared using the same procedure described in step 1 of the PDMA synthesis.

2-(2-[2-(1,3-Dioxan-2-yl)]phenoxy)ethyl acrylate (2DPEA) (III-D)

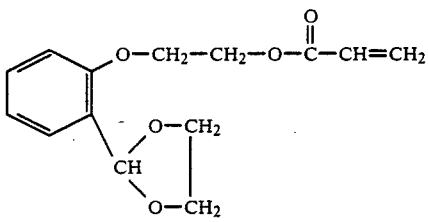

The monomer was prepared from 2-(2-formylphenoxy)ethyl acrylate (2-FPEA) whose preparation is described in step 2 of the 2-DMPEA synthesis (see Monomer III-C).

In a 500 ml. round bottom flask fitted with a Dean-Stark trap, condenser, mechanical stirrer, thermometer, and a heating mantle, were placed 110 g. of the 2-FPEA (0.5 mole) 47 g. ethylene glycol (0.75 mole), 250 ml. cyclohexane and 5 g. polystyrene sulfonic acid (Dow M-31 resin). The reaction mixture was refluxed for 3 hours. When 9 ml. of water was collected, it indicated the reaction was complete. The reaction mixture was cooled and filtered through a wire mesh to remove the resin catalyst. The mixture had two phases. The upper phase containing cyclohexane was discarded. The lower phase was dissolved in 250 ml. ethyl ether, washed five times with water (100 ml.) to remove the unreacted glycol and then washed with saturated sodium chloride solution. The ether solution was dried over anhydrous sodium sulfate and filtered. The solvent was removed under reduced pressure and then under high vacuum to obtain 120 g. (90% yield) of the monomer. By 1-H NMR analysis the product showed signals consistent with the structure shown above. The presence of 5 mole % unreacted aldehyde indicated it to be 97% pure.

2-Hydroxy-3-(4-dimethoxymethylphenoxy)propyl methacrylate (III-E)

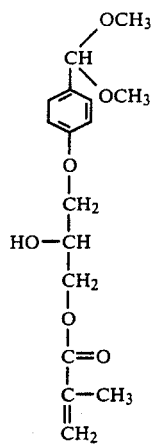

In a 500 ml. 4-neck flask fitted with a mechanical stirrer, thermometer, condenser and a vented nitrogen bubbler were placed 84 g. 4-dimethoxymethyl phenol (0.5 mole), 71 g. glycidyl methacrylate (GMA) (0.5 mole), and 1.5 g. benzyl tributyl ammonium chloride (0.005 mole). The apparatus was flushed with air for 5 minutes and the solution was then heated to 80° C. for 5 hours. The progress of the reaction was followed from disappearance of the GMA. Gas chromatographic analysis of the reaction mixture indicated 95% reaction. The solution was cooled and dissolved in 250 ml. methylene chloride and washed three times with 1N sodium hydroxide (100 ml.) and then with water until the washings were neutral. The organic layer was dried over magnesium sulfate and the solvent was removed at reduced pressure using a Rotovap. The oily residue was dried under high vacuum for 30 minutes. The yield was 133 g. (86%) product. H-1 NMR showed signals typical of GMA except the signal for the protons that were attached to the epoxide carbon at 2.8 and 3.3 ppm showed up as doublets and a quintet respectively. The spectrum also showed signals for the 4-dimethoxymethylphenyl group at ppms 7.8–6.9 and 3.4.

2-Hydroxy-3-(2-dimethoxymethyl phenoxy)propyl acrylate (III-F)

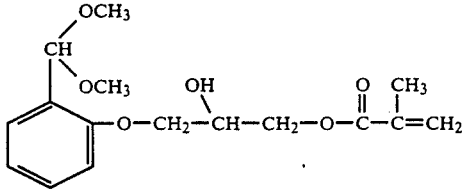

It was prepared by the above procedure using 2-dimethoxymethylphenol instead of 4-dimethoxymethylphenol.

Part B

Table I shows reagents which can be used to prepare additional acetal-containing monomers.

EXAMPLE IV

The following methods were used to graft polymerize the acetal containing monomer onto starch.

TABLE I
REACTION SEQUENCE FOR PREPARATION OF ACETAL-CONTAINING MONOMERS

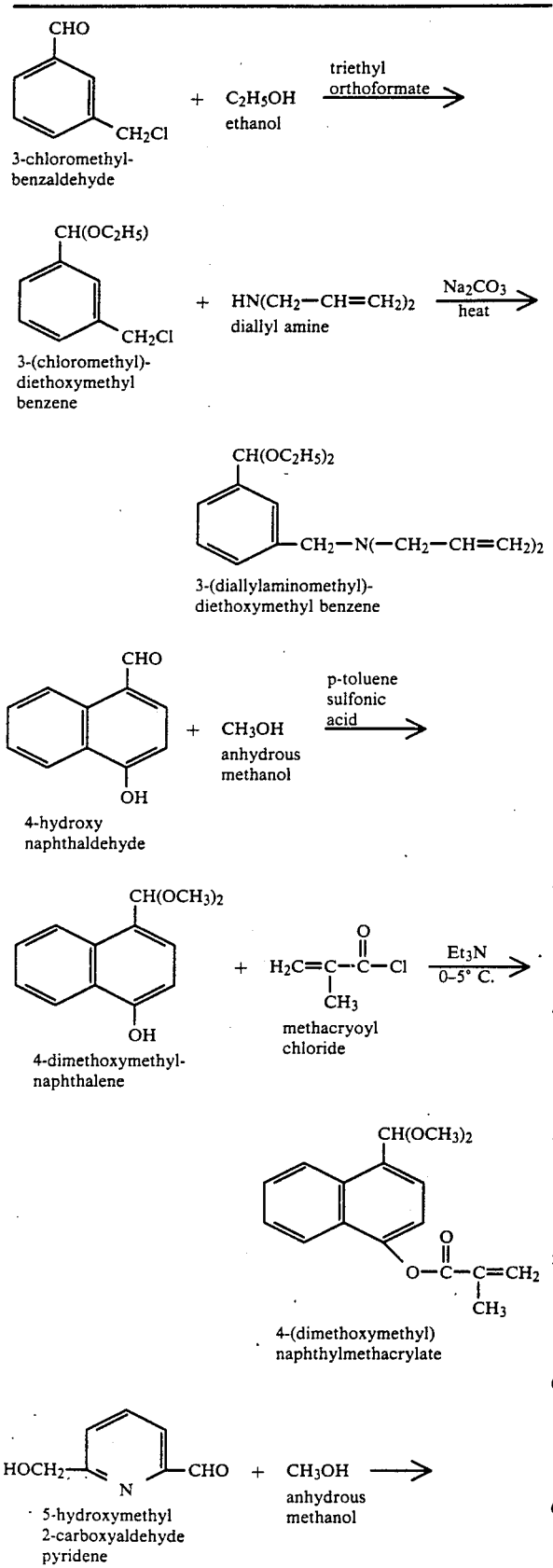

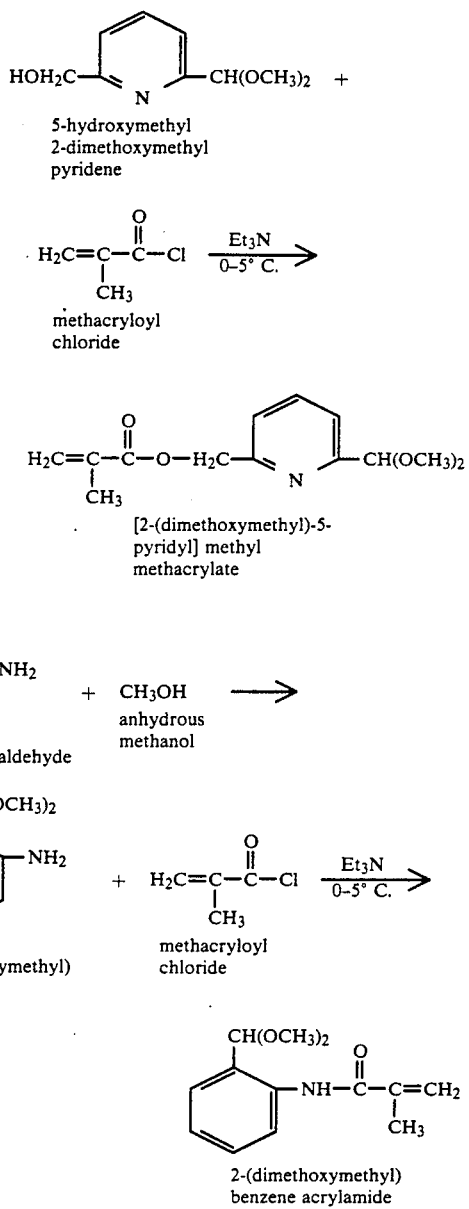

Method A the acetal-containing monomer (8.0 g.) was dissolved in degassed water (16.0 g.) in a 250 ml. four neck round bottom flask equipped with a mechanical stirrer, condenser, addition funnel, and nitrogen gas inlet. To this was added 40.0 g. granular starch, 100 g. Isopar M (a branched-chain isoparaffinic oil obtained from Exxon Corporation) and 3.72 g. Tween 85 and 0.94 g. Span 80 (surfactants obtained from Imperial Chemical Industries). the temperature of the resulting suspension was raised to 65° C., and t-butyl peroxypivalate (0.2. ml. in 2 ml. Isopar M) was added in three portions, one hour apart. The reaction was held for an additional three hours and then filtered, washed with an ethanol-water mixture (50%), and dried.

Method B

A starch dispersion was prepared by cooking 30 g. of an acid-hydrolyzed starch having a water fluidity (WF) of 85 in 60 g. of degassed water for 20 minutes. It was added to a 250 ml. four-neck round bottom flask equipped with a mechanical stirrer, condenser, addition funnel, and nitrogen gas inlet. The acetal-containing monomer (6.0 g.) was added with stirring and the temperature was raised to about 65°–70° C. An initiator solution of t-butyl hydrogen peroxide (0.1 g. of a 72% solution further diluted in 3.0 g. degassed water) was added in three portions, one hour apart. The reaction mixture was held for an additional three hours. Monomethyl ether hydroquinone was added to stop the reaction, the resulting starch dispersion was acetone precipitated, filtered, washed, and dried.

The results are summarized in Table II. The results show that the starches modified by the introduction of an unsaturated substituent (i.e., 3-allyloxy 2-hydroxypropyl ether groups from reaction with allyl glycidyl ether) gave better grafting efficiency than the unmodified starch as indicated by the higher nitrogen % or aldehyde %.

EXAMPLE V

The following method was used to graft polymerize an acetal-containing monomer onto a cellulose derivative.

A total of 4 g. of N-(2,2-dimethoxyethyl), N-methyl acrylamide was added to a 4-neck round bottom flask equipped with a mechanical stirrer, condenser, addition funnel, and nitrogen inlet and 8 g. of degassed water were added. Hydroxyethyl cellulose (20 g.), Isopar M (50 g.), Tween 85 (1.86 g.) and Span 80 (0.47 g.) were added and stirred to form a suspension. The temperature was raised to 65°–70° C. The catalyst t-butyl peroxypivalate (0.2 ml. in 2 ml. Isopar M) was added in three portions one hour apart. The reaction mixture was heated for an additional 3 hours, the heat was turned off, and mixture was stirred overnight. The product was washed three times with ethanol, then three times with acetone, and dried. The N content was 0.55% (expected 1.34%).

EXAMPLE VI

This example describes the preparation of a starch graft polymer and its derivatization with a functional amine (i.e., one containing silane groups) and a long chain amine.

Part A

Preparation Of The Aromatic Acetal-Containing Starch Graft Polymer

A converted waxy maize starch (85 water fluidity) is modified with allyl glycidyl ether using standard starch reaction conditions. A total of 50 g. of this starch is cooked in a boiling water bath for twenty minutes and

TABLE II

| Starch | | Acetal Monomer | | | Polymer Analyses | | Properties | |
|---|---|---|---|---|---|---|---|---|
| (Base) | (Parts) | | (Parts) | Procedure | Acetal N (%) | CHO (%) | Cook | Film |
| Corn | 40 | a. | 8.0 | A | 0.12 | — | Stable, soft-set Adjust pH = 2.0 and became chunky | — |
| Corn treated with 0.5% AGE | 40 | a. | 8.0 | A | 0.17 | — | Stable Adjust pH = 2.0 and became chunky | — |
| Waxy Corn (85 WF) | 30 | b. | 6.0 | B | — | 0.79% | Thin, slightly cloudy | Insoluble Film (pH = 2.5) |
| Waxy Corn (85 WF) treated with 1% AGE | 30 | b. | 6.0 | B | — | 1.61% | Thin, slightly cloudy | Insoluble Film (pH = 2.5) |
| Waxy Corn (85 WF) | 30 | c. | 6.0 | B | — | 0.92% | Thin, slightly cloudy | Insoluble Film (pH = 2.5) |
| Waxy Corn (85 WF) treated with 1% AGE | 30 | b. | 6.0 | B | — | 1.65% | Thin, slightly cloudy | Insoluble Film (pH = 2.5) |
| Waxy Corn (85 WF) treated with 1 % AGE | 30 | d. | 6.0 | B | — | 0.72% | Thin, slightly yellow | Soluble Film (pH = 2.5) |
| Corn | 40 | e. | 6.0* | A | 0.06% | — | Unstable | |
| Corn treated with 0.5% AGE | 40 | e. | 6.0* | A | 0.34% | — | Stable Adjust to pH = 2.0 and no gel formed | Insoluble Film (pH = 2.5) |
| Waxy Corn treated with 3.25% DEC | 40 | a. | 8.0 | A | 0.05% | — | Cohesive Stable | — |
| Waxy Corn treated with 3.25% DEC and 0.5% AGE | 40 | a. | 8.0 | A | 0.32% | — | Cohesive Adjust to pH = 2.0 | — | a. N-(2,2-dimethoxyethyl), N-methacrylamide
b. 3,3-(dimethoxy-2,2-dimethylpropyl methacrylate
c. 2-[2-1,3-dioxolan-2-yl)-1-methylethoxy]ethyl methacrylate (see - Example I - monomer I-B)
d. [5-(dimethoxymethyl) furfur-2-yl]methyl acrylate (see - Example I - monomer I-J)
e. N-methyl, N-(2,2-dimethoxy)ethyl, N,N-diallylammonium bromide (see - Example I - monomer I-C)
*4.0 parts of acrylic acid (adjusted to pH = 7.0 with 20% NaOH) was added in the graft polymerization and the hydroscopic acetal monomer was used as is.
AGE is allyl glycidyl ether
DEC is diethylaminoethyl chloride hydrochloride then introduced into a 1000 ml. Morton flask equipped with a reflux condenser, addition funnel, thermometer, and overhead stirrer. An appropriate amount (5.0 g.) of the aromatic acetal-containing monomer 5-(dimethoxymethyl)furfur-2-yl] methyl acrylate (see monomer I-J of Example I) is added to the reaction flask and the pH is adjusted to 7.0. Ammonium persulfate (0.4 g.) is dissolved in 24 ml. of degassed water and added to the reaction in one-third increments over three hours. The reaction is allowed to stir an additional four hours, inhibited with hydroquinone monoethyl, and the acetal-containing starch graft polymer is precipitated from acetone.

Part B

Derivatization Of The Aromatic Acetal-Containing Starch Graft Polymer With An Amine The starch graft polymer (50 g.) from part A is placed in 250 ml. of water and the pH is adjusted to 2.5. The solution is heated in a boiling water bath for 20 minutes and then cooled to room temperature. The pH is adjusted to 7.0 using 3% sodium hydroxide and 10 g. of 3-aminopropyl triethoxysilane is added. The solution is stirred for two hours. The product is precipitated from the solution using acetone. After filtration the product is washed three times with acetone (200 ml.) and air-dried.

Part C

Derivatization Of The Aromatic Aldehyde-Containing Starch Graft Polymer With A Long Chain Amine A sample of the acetal-containing starch graft polymer from Part A is placed in 250 ml. of water and the pH adjusted to 2.5 to convert the acetal groups to aldehyde groups. The solution is heated in a boiling water bath for 20 minutes then cooled to room temperature. The pH is readjusted to 7.0 using 3% sodium hydroxide and 10 g. of polyethyleneglycol monoamine (also known as Jeffamine M-360 from Texaco) is added to the solution and stirred for two hours. The product is precipitated into acetone, washed three times with acetone (150 ml.), and air-dried.

EXAMPLE VII

This example describes the derivatization of starch grafted with an aliphatic aldehyde using a functional amine.

Part A

Preparation Of The Aliphatic Aldehyde-Containing Starch Graft Polymer

The starch graft polymer is prepared using Method A described in Example IV. The starch base is a waxy corn starch treated with 0.5% allylglycidyl ether. The monomer used is N-methyl-N-(2,2-dimethoxyethyl-N,N-diallylammonium bromide (Monomer I-C of Example I).

Part B

A total of 50 g. of the starch graft polymer of Part A is placed in 250 ml. of water and the pH adjusted to 2.5. A total of 10 g. 3-aminopropyl triethoxysilane is added to the solution. The solution is heated in a boiling water bath for 20 minutes and then cooled to room temperature. The pH is adjusted to 7.0 using 3% sodium hydroxide and stirred for two hours. The product is precipitated from solution using acetone and filtered. The material is washed three times with acetone (200 ml.) and air-dried. The resulting material will be derivatized and may be somewhat crosslinked.

EXAMPLE VIII

The example describes the preparation of a cellulose graft polymer containing aromatic aldehyde groups and derivatization of the graft polymer with a functional amine.

Part A—Preparation Of The Cellulose Graft Polymer

A total of 4 g of [5-(dimethoxymethyl)furfur-2-yl] methyl acrylate (see monomer I-J of Example I) is added to a 4-neck round bottom flask equipped with a mechanical stirrer, condenser, addition funnel, and nitrogen inlet and 8 g. of degassed water are added. Hydroxyethyl cellulose (20 g.), Isopar M (50 g.), Tween 85 (1.86 g.) and Span 80 (0.47 g.) are added and stirred to form a suspension. The temperature is raised to 65°–70° C. The catalyst t-butyl peroxypivalate (0.2 ml in 2 ml. Isopar M) is added in three portions one hour apart. The reaction mixture is heated for an additional 3 hours, the heat is turned off, and mixture is stirred overnight. The product is washed three times with ethanol, then three times with acetone, and dried.

Part B

The cellulose graft polymer (50 g.) is placed in 250 ml. of water and the pH adjusted to 2.5. The solution is heated in a boiling water bath for 20 minutes and then cooled to room temperature. The pH is adjusted to 7.0 using 3% sodium hydroxide. A total of 10 g. 3-aminopropyl triethoxysilane is added to the solution and stirred for two hours. The product is precipitated from solution using acetone and filtered. The material is washed three times with acetone (200 ml.) and air dried.

EXAMPLE IX

This example describes the preparation of a gum graft polymer containing aromatic acetal groups and its derivatization with a functional amine.

Part A

Guar gum is modified with allyl glycidyl ether using standard reaction conditions. The aromatic acetal-containing monomer of Example I (Monomer I-L) (8.0 g) is dissolved in degassed water (16.0 g.) and added to a 250 ml. round bottom flask equipped with a mechanical stirrer, addition funnel, and nitrogen inlet. To this solution is added 40.0 g. guar gum, 100 g. Isopar M, 3.72 g. Tween 85 and 0.94 g. Span 80. The temperature of the resulting suspension is raised to 65° C. and t-butyl peroxypivalate (0.2 ml in 2 ml Isopar M) is added in three portions at one hour intervals. The reaction mixture is held for an addition three hours. Then it is filtered, washed with ethanol-water (50%), and air dried.

Part B

A total of 5.0 g of the guar gum graft polymer from Part A is suspended in 200 ml. of water and the pH is adjusted to 2.5 with HCl. The mixture is heated in a boiling water bath for 20 minutes, cooled to room temperature, and the pH adjusted to 7.0 with 0.1 N sodium hydroxide. A total of 3 g. aminopropyl trimethoxysilane is added to the mixture and stirred for two hours. The gum is recovered by precipitating into acetone and filtering.

EXAMPLE X

This example describes the use of the long chain amine derivative of Example VI—Part C to emulsify crude oil. A total of 5 g. of the derivatized starch graft polymer is dissolved in 100 ml. of water and heated gently to facilitate dispersion. A pint jar is coated with 1.0 g. of crude oil to give an even coating on the entire glass surface. A starch solution is added to the jar. The jar is sealed and shaken for approximately 1 minute, then allowed to stand, and examined at various intervals. No phase separation or redeposition of oil on the glass surface should appear for at least one hour.

EXAMPLE XI

This example describes the preparation of crosslinked starch graft polymers using various polyfunctional compounds such as polyethyleneimine, diethylene triamine, 2,5-hexanedione, and adipic dihydrazide. The starch graft polymer, such as the aromatic acetal-containing starch graft polymer of Example VI-Part A, is dispersed by cooking for 20 minutes at a PH of 2.5 in a boiling water bath. Cooking at pH 2.5 converts the acetal to the aldehyde. After the addition of 2-10%, preferably 1-5% (based on the starch), of the polyfunctional compound, the starch crosslinks. The starch cooks would be expected to change from a creamy consistency to a gel, thus indicating crosslinking had occurred.

EXAMPLE XII

This example describes the preparation of a crosslinked derivatized graft polymer of starch.

A graft polymer was prepared from a 85 W.F. waxy corn starch treated with 0.5% allyl glcidyl ether and 2[2-(1,3-dioxolan-2-yl)ethoxyethyl methacrylate (Monomer I-A of Example I), using method A of Example IV. A total of 50 g. of the resulting polymer is placed in 250 ml. of water. The pH is adjusted to 2.5 and the mixture is stirred for 24 hours. The pH is readjusted to 7.0 using 3% sodium hydroxide and 10g. polyethyleneglycol monoamine is added and the solution is stirred for two hours. The starch product is washed three times with water (250 ml.) and air-dried. The resulting starch product should be granular and crosslinked and derivatized by the long chain amine.

Now that the preferred embodiments of the invention have been described in detail, various modifications and improvements thereto will become readily apparent to those skilled in the art. Accordingly, the spirit and scope of the present invention are to be limited only by the appended claims, and not by the foregoing specification.

What is claimed is:

1. A derivatized graft polymer of a polysaccharide having the structure Sacch-g-[(M—CH=N—Y)$_x$]-g-[(M)$_q$], where Sacch represents a polysaccharide; g represents a graft; M represents a repeating unit derived from one or more ethylenically or allylically unsaturated monomers, at least one of which contains an aldehyde or acetal group; Y represents (a) a monovalent group derived from a water-soluble substituted or unsubstituted aromatic compound containing only one primary amine group, or (b) a monovalent group derived from a water-soluble substituted or unsubstituted aliphatic or cycloaliphatic compound containing only one primary amine group, or (c) a multivalent group derived from a water-soluble protein containing more than one primary amine group; —CH=N—Y is the group formed by the reaction of the aldehyde or acetal group of the monomer repeating unit M with the free primary amine group of Y; x is at least 1; and q is 0 or greater.

2. The polymer of claim 1, wherein the polysaccharide is a starch, a gum, or a cellulose.

3. The polymer of claim 1, wherein the polysaccharide is a starch; wherein at least one of the monomer repeating units M is from an aromatic acetal- or aldehyde-containing monomer and wherein, after reaction of the acetal or aldehyde group with the amine group of Y, the (M—CH=N—Y) group has the structure:

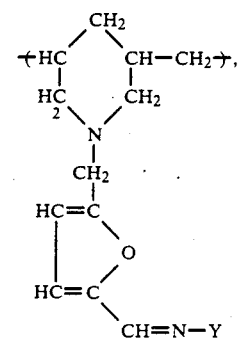

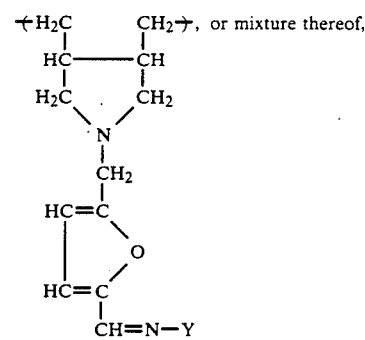

4. The polymer of claim 1, wherein the polysaccharide is a starch; wherein at least one of the monomer repeating units M is from an aromatic acetal- or aldehyde-containing monomer and wherein, after reaction of the acetal or aldehyde group with the amine group of Y, the (M—CH=N—Y) group has the structure:

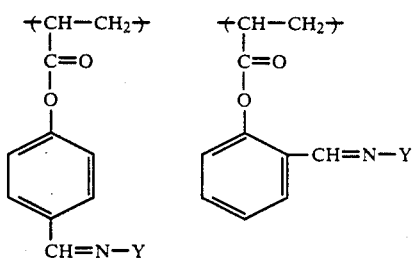

-continued
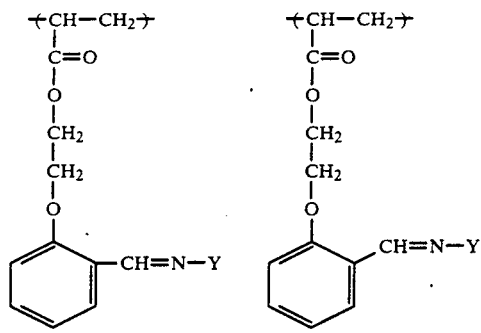 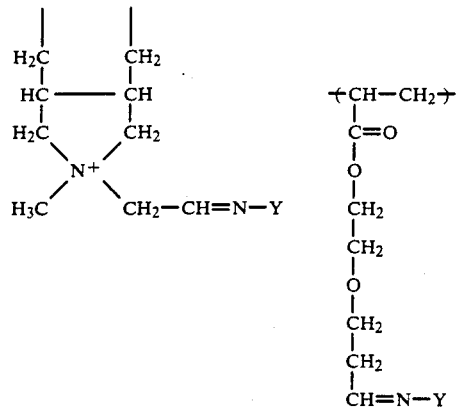
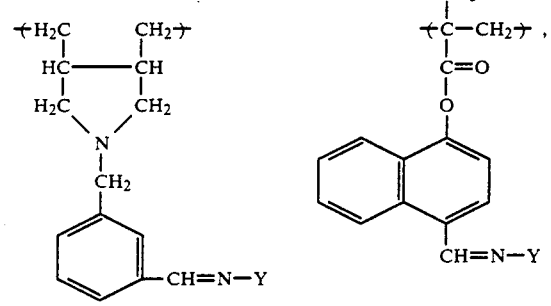 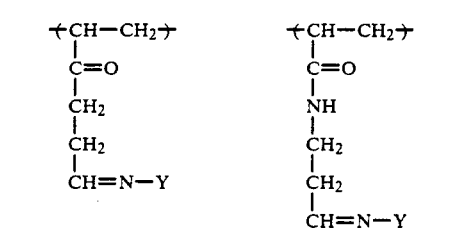
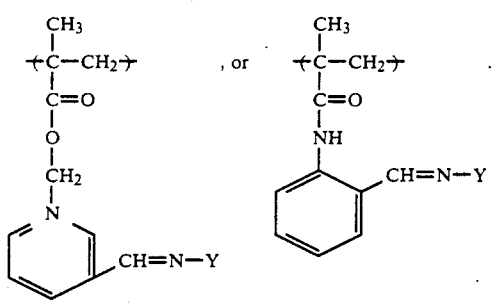 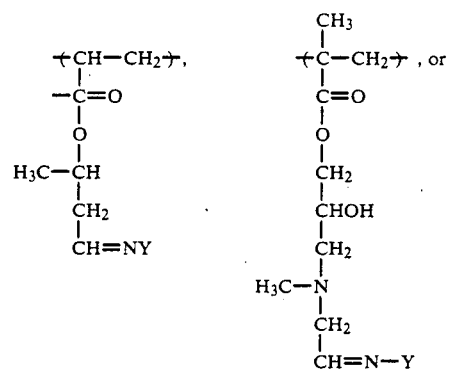
5. The polymer of claim 1 wherein the polysaccharide is a starch; wherein at least one of the monomer repeating units M is from an aliphatic acetal- or aldehyde-containing monomer and wherein, after reaction of the acetal or aldehyde group with the amine group of Y, the (M—CH=N—Y) group has the structure:
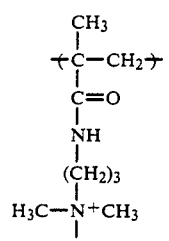
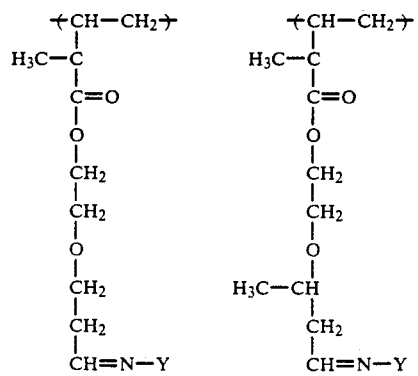 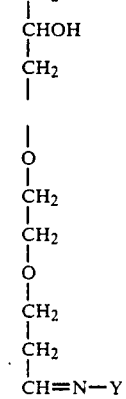

6. The graft polymer of claim 1, wherein the polysaccharide is a starch and wherein Y is derived from 3-aminopropyltriethoxysilane and has the structure —CH$_2$—CH$_2$—CH$_2$—Si(OC$_2$H$_5$)$_3$ or derived from polyethyleneglycol monoamine and has the structure

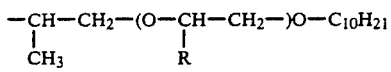

where R is H and CH$_3$ in a 2:3 ratio.

7. The polymer of claim 1 which is prepared by reacting a derivatizing reagent Y—NH$_2$ containing only one primary amine group with a polysaccharide graft polymer having the structure Sacch-g-(M)$_x$, where Sacch, M, Y, and x are as defined in claim 1.

8. The polymer of claim 7, wherein, the polysaccharide is a starch and wherein one of the repeating units M is derived from an acetal-containing monomer selected from the group consisting of 2[2-(1,3-dioxolan-2-yl)ethoxy] ethyl methacrylate; 2[2-(1,3-dioxolan-2-yl)-1-methylethoxy]ethyl methacrylate; N-methyl, N-(2,2-dimethoxy)ethyl, N,N-diallylammonium bromide; 2-(5,5-dimethyl-1,3-dioxan-2-yl)ethoxyethyl acrylate; 2-(5,5-dimethyl-1,3-dioxan-2-yl)ethyl acrylate; N-[2-(5,5-dimethyl-1,3-dioxan-2-yl)ethyl acrylamide; 1-(5,5-dimethyl-1,3-dioxan-2-yl)-2-propyl acrylate; 3-N-methyl, N-2,2-dimethoxyethyl)amino-2-hydroxypropyl methacrylate; N,N-dimethyl, N-[3-(2-dioxolan-2-yl)ethoxyethoxy-2-hydroxypropyl methacrylamidopropylammonium chloride; 5-(N,N-di[propyl-1-en-]aminomethyl)-2-dimethoxymethyl furan; phenyl (4-dimethoxymethyl) acrylate; phenyl (4-dimethoxymethyl) acrylate; 2-(2-dimethoxymethyl phenoxy)ethyl acrylate; 2-[2- 2-(1,3-dioxalano) phenoxy]ethyl acrylate; 2-hydroxy-3-(4-dimethoxymethyl phenoxy) propyl, 2-methyl propenoate; and 2-hydroxy-3-(2-dimethoxymethyl phenoxy propyl 2-methyl propenoate; or wherein one of the repeating units M is derived from an aldehyde-containing monomer is selected from the group consisting of 5-(dimethoxymethyl)furfur-2-yl]methylacrylate and 5-(N,N-di-[propyl-1-en-3-]-aminomethyl)-2-furan carboxaldehyde; and wherein the derivatizing reagent Y—NH$_2$ containing at least one primary amine group is selected from the group consisting of polyethyleneglycol monoaime, 3-aminopropyltrimethoxysilane, 3-aminopropyltriethoxysilane, cyclohexylamine, ethanol amine, benzyl amine, isopropyl amine, and amino acids.

9. The polymer of claim 4, wherein the polysaccharide is a starch selected from the group consisting of corn, waxy maize, high amylose corn, tapioca, rice, and potato starch.

10. The polymer of claim 5, wherein the polysaccharide is a starch selected from the group consisting of corn, waxy maize, high amylose corn, tapioca, rice, and potato starch.

11. The polymer of claim 6, wherein the polysaccharide is a starch selected from the group consisting of corn, waxy maize, high amylose corn, tapioca, rice, and potato starch.

12. A crosslinked graft polymer of a polysaccharide having the structure

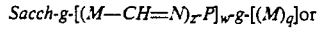

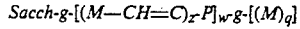

where Sacch represents a polysaccharide, M represents a repeating unit derived from one more ethylenically or allylically unsaturated monomers, at least one of which contains an acetal group or aldehyde group; P represents a multivalent residue from a reagent containing more than one primary amine group or ketone group; —N= represents the group formed when one primary amine group of P reacts with the acetal or aldehyde group of the monomer repeating unit M; —CH= represents the group formed when one of the ketone groups of P reacts with the acetal or aldehyde group of the monomer repeating unit M; z is at least 2; w is at least 1; and q is 0 or greater.

13. The polymer of claim 12 which is crosslinked through —CH=N— linkages and which is prepared by reacting a polysaccharide graft polymer with a crosslinking reagent containing at least two primary amine groups, where the polysaccharide graft polymer has the structure Sacch-g(M)$_x$, where Sacch, M, and x are as defined in claim 12.

14. The polymer of claim 12 crosslinked through —CH=H— linkages which is prepared by reacting a polysaccharide graft polymer with a crosslinking reagent containing at least two ketone groups, where the polysaccharide graft polymer has the structure Sacch-g(M)$_x$, where Sacch, M and x are as defined in claim 12.

15. The polymer of claim 12, wherein the polysaccharide is a starch, a gum, or a cellulose.

16. The polymer of claim 15, wherein the polysaccharide is a starch selected from the group consisting of corn, waxy maize, high amylose corn, tapioca, rice, and potato starch.

17. A derivatized and crosslinked graft polymer of a polysaccharide having the structure Sacch-g-[(M—CH=N—Y)$_x$]-g-[(M—CH=N)$_z$—P]$_w$-g-[(M)$_q$] or Sacch-g-[(M—CH=N—Y)$_x$]-g-[(M—CH=C)$_z$—P]$_w$-g-[(M)$_q$], where Sacch represents a polysaccharide; M represents a repeating unit derived from one more ethylenically or allylically unsaturated monomers, at least one of which contains an acetal group or an aldehyde group; Y represents (a) a monovalent group derived from a water-soluble substituted or unsubstituted aromatic compound containing only one primary amine group, or b) a monovalent group derived from a water-soluble substituted or unsubstituted aliphatic or cycloaliphatic compound containing only one primary amine group, or (c) a multivalent group derived from a water-soluble protein containing more than one primary amine group; P represents a multivalent residue from a reagent containing more than one primary amine group or ketone group; —N= represents the group formed when one primary amine group of P reacts with the acetal or the aldehyde group of the monomer repeating unit M; —CH= represents the group formed when one of the ketone groups of P reacts with the acetal or the aldehyde group of the monomer repeating unit M; x is at least 1; z is at least 2; w is at least 1; and q is 0 or greater.

18. The polymer of claim 17 prepared by reacting a derivatized graft polymer of a polysaccharide with a crosslinking reagent containing more than one primary amine or ketone group or by reacting a crosslinked graft polymer of a polysaccharide with a derivatizing reagent containing only one primary amine group.

19. The polymer of claim 17, wherein the polysaccharide is a starch, a gum, or a cellulose.

20. The polymer of claim 18, wherein the polysaccharide is a starch selected from the group consisting of corn, waxy maize, high amylose corn, tapioca, rice, and potato starch.

* * * * *